United States Patent [19]

Kukes et al.

[11] Patent Number: 4,802,920

[45] Date of Patent: Feb. 7, 1989

[54] EXTRACTION OF METALS FROM AQUEOUS SOLUTIONS WITH ASPHALTENES

[75] Inventors: Simon G. Kukes; Clifford E. Smith, both of Bartlesville, Okla.

[73] Assignee: Phillips Petroleum Company, Bartlesville, Okla.

[21] Appl. No.: 810,464

[22] Filed: Dec. 18, 1985

[51] Int. Cl.$^4$ .............................................. C22B 11/04
[52] U.S. Cl. ............................ 75/118 R; 75/101 BE; 423/24; 423/25; 210/671; 210/684; 210/685; 210/688
[58] Field of Search ............... 75/101 BE, 108, 128 R; 423/24, 139, 25; 210/660, 688, 680, 684, 681, 685, 670, 671, 715, 716, 721, 725

[56] References Cited

U.S. PATENT DOCUMENTS

| | | | |
|---|---|---|---|
| 560,997 | 5/1896 | Hunicke | 75/118 R |
| 1,966,729 | 7/1934 | Loomis et al. | 423/24 |
| 2,162,936 | 6/1939 | Burrell | 423/24 |
| 2,523,582 | 9/1950 | Mattson | 260/504 |
| 2,650,198 | 8/1953 | Krönig et al. | 252/33.4 |
| 2,748,057 | 5/1956 | Goren | 75/101 BE |
| 3,089,842 | 5/1963 | Stratton | 208/44 |
| 3,190,829 | 6/1965 | Erdman | 208/252 |
| 3,432,257 | 3/1969 | Spitzer et al. | 423/24 |
| 4,269,789 | 5/1981 | Zornes | 260/505 P |

FOREIGN PATENT DOCUMENTS 2502254  8/1983  Fed. Rep. of Germany.

Primary Examiner—Robert L. Stoll
Attorney, Agent, or Firm—Paul S. Chirgott

[57] ABSTRACT

A process for extracting metals from aqueous solutions containing such metals comprising contacting such an aqueous solution with an asphaltene to extract at least one metal from the aqueous solution to the asphaltene, and recovering the thus extracted at least one metal from the asphaltene. Also disclosed is a process for sulfonating a petroleum fraction containing asphaltenes, the thus sulfonated asphaltenes being advantageously employable in the process for extracting at least one metal from an aqueous solution containing such metal.

47 Claims, No Drawings

EXTRACTION OF METALS FROM AQUEOUS SOLUTIONS WITH ASPHALTENES

The present invention relates generally to the extraction of metals from aqueous solutions. In another aspect, the present invention relates to the preparation of sulfonated asphaltenes. A still further aspect of the present invention relates to the use of sulfonated asphaltenes in the extraction of metals from aqueous solutions.

Valuable metals are often found in aqueous solutions. For example, it is known that gold and silver salts exist in aqueous solutions and sea water. It would be desirable to economically recover such metals from aqueous solutions such as sea water.

It is, therefore, an object of this invention to provide a method for recovering metals from aqueous solutions.

Another object of this invention is to provide an economical method for extracting valuable metals from aqueous solutions.

A further object of this invention is to utilize asphaltenes in the extraction of metals from aqueous solutions.

Still another object of this invention is to employ sulfonated asphaltenes in the extraction of metals from aqueous solutions.

A still further object of this invention is to provide an economical method of extracting gold and/or silver from aqueous salt solutions such as sea water.

Accordingly, we have discovered that at least one metal can be extracted from an aqueous solution containing such metal by contacting the aqueous solution with an asphaltene to extract the at least one metal from the aqueous solution to the asphaltene, and thereafter recovering the thus extracted at least one metal from the asphaltene.

In another aspect of this invention, we have discovered a process for sulfonating a petroleum fraction containing asphaltenes comprising the steps of reacting a quantity of petroleum fraction containing asphaltenes with a sulfonating agent, such as, for example, $SO_3$, $SO_2$, $H_2SO_4$ and related compounds and combinations of any two or more thereof, under sulfonating conditions to produce a reaction product comprising sulfonated asphaltenes; and recovering the sulfonated asphaltenes from the reaction product, such as, for example, by subjecting the reaction product to elevated temperatures and/or subatmospheric pressure to separate other components of the reaction product from the sulfonated asphaltenes. We have further discovered that such sulfonated asphaltenes can be advantageously employed in the above-described method of extracting at least one metal from an aqueous solution containing such metal.

Other objects, aspects, advantages and embodiments of this invention will be evident from the following detailed decription which illustrates the various aspects and embodiments of this invention.

As used herein, the term "petroleum fraction containing asphaltenes" is defined generally as the bottoms fraction produced by solvent extraction of heavy oil having an initial boiling point of about 650° F. (343° C).

Suitable sulfonating agents, include, but are not limited to, $SO_2$, $SO_3$, $H_2SO_4$ and related compounds and combinations of any two or more thereof. Such sulfonating agents may be advantageously employed in suitable diluents such as halogen-substituted alkanes including dichloroethane and the like.

The inventive process for extracting at least one metal from an aqueous solution containing the at least one metal comprises two steps. The first step involves contacting the aqueous solution with an asphaltene to extract the at least one metal from the aqueous solution to the asphaltene. The second step involves recovering the thus extracted at least one metal from the asphaltene. The second or recovering step can be any step which will provide the desired separation of the metal from the asphaltene. It is presently preferred to recover the metal from the asphaltene by oxidizing the asphaltene and the thus extracted at least one metat to produce oxidized asphaltene and oxides of the at least one metal, followed by separating the oxides of the at least one metal from the oxidized asphaltene resulting from the oxidizing step.

The first or contacting step of the process for extracting at least one metal from the aqueous solution containing the at least one metal may suitably employ a sulfonated asphaltene as the recited asphaltene. Such sulfonated asphaltene can be advantageously produced by reacting a quantity of a petroleum fraction containing asphaltenes with a sulfonating agent under sulfonating conditions to produce a reaction product comprising sulfonated asphaltenes, and thereafter recovering the sulfonated asphaltenes from the reaction product. A suitable petroleum bottoms fraction for employment in this process is a petroleum bottoms fraction produced by solvent extraction of heavy oil having an initial boiling point of about 650° F. (343° C.).

Metals which can be advantageously recovered from aqueous solutions employing the method of the present invention include, but are not necessarily limited to gold, silver and iron. The method of the present invention has been shown to be most advantageous when employed for the extraction of gold and/or silver from aqueous solutions.

The present invention further includes a process for sulfonating a petroleum fraction containing asphaltenes. This process generally includes reacting a quantity of a petroleum fraction containing asphaltenes, such as, for example, the bottoms fraction produced by solvent extraction of heavy oil having a initial boiling point of about 650° F. (343° C.), with a sulfonating agent under sulfonating conditions to produce a reaction product comprising sulfonated asphaltenes. Suitable sulfonating conditions include a reaction pressure equal to atmospheric pressure or higher and a reaction temperature equal to ambient temperature or higher. Suitable sulfonating agents include those compositions selected from the group consisting of $SO_3$, $SO_2$, $H_2SO_4$ and related compounds and combinations of any two or more thereof. Such compositions may, if desired, be in solution with a suitable diluent such as halogen-substituted alkanes or the like, with dichloroethane being a presently preferred diluent. A presently preferred sulfonating agent is $SO_3$, preferably in solution with dichloroethane. The reaction product produced in the first step of the process for sulfonating a petroleum fraction containing asphaltenes is then followed by the recovery of the sulfonated asphaltenes from the reaction product. Such recovery can be advantageously performed by subjecting the reaction product to elevated temperatures and subatmospheric pressure to separate any diluent, such as dichloroethane, and other components of the reaction product from the sulfonated asphaltenes.

The following examples illustrate the present invention and demonstrate the advantages thereof.

EXAMPLE I

This example illustrates the extraction of metals from aqueous solutions by means of asphaltenes. Asphaltenes were isolated from a Monagas heavy crude oil by mixing and stirring it with n-pentane at an oil to pentane volume ratio of 1:40. The asphaltenes were then separated from n-pentane by filtration, and were washed several times with n-pentane. The product was labeled *Asphaltene A*. Various samples, each consisting of 100 mL of an aqueous metal salt solution (each containing 0.1 gram of one particular metal salt), were each stirred with 10 grams of Asphaltene A, and the resulting mixtures were heated under reflux conditions for about 3 hours.

The following solutions of metal salts were tested:
$AgNO_3$;
$Cd(NO_3)_2.4H_2O$;
$Ca(NO_3)_2.4H_2O$;
$Cu(C_2H_3O_2).H_2O$;
$Zn(NO_3)_2.XH_2O$;
$Sr(NO_3)_2$;
$Cr(NO_3)_3.9H_2O$;
$Co(NO_3)_2.6H_2O$;
$Fe(NO_3)_3.9H_2O$; and
$Ni(NO_3)_2.6H_2O$.

The cooled, refluxed mixtures were filtered. The filtrates were acidified with $HNO_3$ (to pH:1.4) and analyzed by plasma emission analysis, which revealed that only Ag, Cr and Fe had been absorbed by the asphaltenes from the aqueous solutions.

EXAMPLE II

This example illustrates the extraction of another metal from its aqueous solution by means of asphaltenes. The asphaltene used was isolated from the extraction bottoms fraction of a heavy oil solvent extraction (HOE) process carried out in a pilot plant. 300 grams of this HOE bottoms product was finely ground and added to 3000 mL of n-hexane. The mixture was then heated for about 2 hours to 145°–150° F. with stirring and cooled. The supernatant solution was decanted, 3000 mL of fresh n-hexane was added to the residue, and the mixture was heated at 150° F. for about 2 hours. This procedure was repeated 5 more times. The extracted residue was dried in a vacuum oven at 110° C./20 inches Hg. The dried product was labeled *Asphaltene B*.

A mixture of 2 mL of an aqueous $HAuCl_4$ solution (containing about 1000 ppm Au) and 2 mL of an aqueous $H_2PtCl_4$ solution (containing about 100 ppm Pt) was prepared, diluted with 16 mL $H_2O$, and heated to 100° C. Then 2 grams of Asphaltene B were added to the solution, which was heated and shaken for 15 minutes. The mixture was filtered. Plasma emission analysis revealed that the filtrate contained: 98.4 ppm Pt and <40 ppb (parts per billion) Au.

The above-described extraction of Au and Pt was repeated with an asphaltene (labeled *Asphaltene C*) prepared by n-heptane extraction of an HOE bottoms fraction, essentially in accordance with the earlier-described procedure in this example, with the exception that the extraction temperature was 180° F. Plasma emission analysis of the aqueous filtrate, after shaking and heating with Asphaltene C for 15 minutes, revealed that it contained 82 ppm Pt and <40 ppb Au.

These two extraction tests demonstrated that Au was effectively extracted with asphaltenes from an aqueous solution of $HAuCl_4$. Extraction of Pt was rather insignificant.

EXAMPLE III

This example illustrates the extraction of Au from aqueous solutions with asphaltenes, at different temperatures. 19 mL of an aqueous $HAuCl_4$ solution containing 1000 ppm Au was diluted with water to give a total solution of 40 mL. Two mixtures were prepared:

Mixture A: 8 mL of this diluted solution was mixed with 1 gram of Asphaltene B (See Example II). Mixture B: Another 8 mL aliquot of the diluted $HAuCl_4$ solution was mixed with 1 gram of Asphaltene C (see Example II).

Each mixture was shaken for 2.5 hours at room temperature. A small portion of each mixture was filtered and analyzed. Au contents in the filtrates were 350 ppm for treated mixture A and 366 ppm for treated mixture B.

The remaining mixtures A and B were then each heated at 100° C. for 2–25 hours. The cooled mixtures were each filtered. Analyses of the filtrates revealed: <0.1 ppm Au for treated mixture A, and 103 ppm Au for treated mixture B.

These tests essentially confirm the results of Example II, and also show the raising the temperature was beneficial to the effective extraction of Au from aqueous solution by means of asphaltenes.

EXAMPLE IV

This example illustrates the extraction of metals from aqueous solutions by means of sulfonated asphaltenes.

A sulfonated asphaltene was prepared by adding a solution of 1.73 grams of $SO_3$ in 150 mL of 1,2-dichloroethane slowly and with vigorous stirring to a second solution containing 20 grams of a bottoms fraction of a heavy oil solvent extraction (HOE) process plus 500 mL of 1,2-dichlorethane. The mixture was allowed to stand for about 16 hours. The solvent was flashed off in a rotary evaporator at 60° C. at full vacuum.

A 10 gram sample of the prepared sulfonated asphaltene product (labeled S-Asphaltene A) was added to each of five 100 mL samples of five different aqueous metal salt solutions. The resulting mixtures were each heated to boiling under reflux conditions for about 7 hours and filtered. This extraction process was repeated for about 18 hours at room temperature followed by filtration.

Analysis data for filtered metal salt solutions [$AgNO_3$, $Cr(NO_3).9H_2O$, $Cu(CH_3CO_2)_2.H_2O$, $Fe(NO_3)_3.9H_2O$, $Ni(NO_3)_2.6H_2O$], after and before treatment with the S-Asphaltene A, are presented in Table I.

TABLE I

| | PPM Metal in Solution | | |
|---|---|---|---|
| Metal | Before Treatment | After Treatment at Reflux Conduit. | After Treatment at Room Temp. |
| Ag | 313 | 7.5 | 322 |
| Cr | 435 | 435 | 434 |
| Cu | 422 | 405 | 420 |
| Fe | 337 | 459 | 360 |
| Ni | 514 | 504 | 478 |

Data in Table I show that only Ag was extracted from aqueous solutions with sulfonated asphaltenes at elevated temperature (reflux conditions; about 100° C.).

EXAMPLE V

This example describes another extraction process with sulfonated asphaltenes. A solution of 1.88 grams of $SO_3$ in 1,2-dichloroethane was added slowly, with vigorous stirring, to a solution of 20 grams of Asphaltene C (see Example II) in 500 mL 1,2-dichloroethane. The mixture was stirred at ambient temperature for 30 minutes. The solvent was flashed off, and the product (labeled S-Asphaltene C) was dried at 60° C. under vacuum conditions.

A 5 gram sample of S-Asphaltene C was added to each of five 100 mL samples of the aqueous metal salt solutions described in Example IV and the resulting mixtures were each heated with stirring under reflux conditions. Samples of the mixtures were withdrawn after several time periods, filtered and analyzed. Results are summarized in Table II.

TABLE II

| Metal | PPM Metal in Solution | | | |
|---|---|---|---|---|
| | Before Treatment | After Treatment for 60 minutes | After Treatment for 120 minutes | After Treatment for 180 minutes |
| Ag | 430 | 345 | 295 | 290 |
| Cr | 428 | 437 | 453 | 447 |
| Cu | 438 | 456 | 469 | 460 |
| Fe | 394 | 291 | 348 | 371 |
| Ni | 479 | 498 | 517 | 510 |

The above-described heat-treatment of aqueous metal salt solutions was repeated with 10 gram samples of S-Asphaltene C. Test results are summarized in Table III.

TABLE III

| Metal | PPM Metal in Solution | | | |
|---|---|---|---|---|
| | Before Treatment | After Treatment for 20 minutes | After Treatment for 30 minutes | After Treatment for 60 minutes |
| Ag | 430 | 260 | 274 | 132 |
| Cr | 428 | 433 | 449 | 437 |
| Cu | 438 | 467 | 479 | 495 |
| Fe | 394 | 330 | 356 | 385 |
| Ni | 479 | 509 | 519 | 498 |

Data in Tables II and III clearly show that Ag can be extracted from aqueous solutions, at an elevated temperature (about 100° C.), by means of a sulfonated asphaltene.

Essentially the same results were obtained by treatment with S-Asphaltene B (sulfonated Asphaltene B) at reflux conditions: Ag was reduced from 430 ppm to 195 ppm after treatment for 30 minutes; the other metals were not absorbed.

EXAMPLE VI

In this example the extraction of Au and Pt described in Example II was carried out with 2 grams of a sulfonated asphaltene, S-Asphaltene B. Results: the Pt concentration in the filtered solution was 78 ppm Pt (initial concentration: 100 ppm Pt), whereas the Au concentration was dramatically reduced from about 1,000 ppm to <39 ppb (parts per billion) Au.

EXAMPLE VII

In this example the extractions of Au described in Example III were carried out with two sulfonated asphaltenes. Results: The Au concentration was reduced from about 500 ppm Au to 479 ppm Au and 0.3 ppm Au, respectively, after treatment with S-Asphaltene B at room temperature and at 100° C., respectively. The Au concentration was reduced to 179 ppm Au and <0.1 ppm Au, respectively, after treatment with S-Asphaltene C at room temperature and 100° C., respectively.

Another test revealed that Au was effectively absorbed from aqueous $HAuCl_4$ solutions containing also about 20 g/l NaCl with sulfonated asphaltenes at about 100° C. Au concentrations of the aqueous solutions were reduced from about 280 ppm to 60–70 ppb Au by treatment with sulfonated asphaltenes for 5–10 minutes, at about 100° C. These test results indicate that gold can be extracted from sea water or concentrated oil field brines in accordance with this invention.

From the foregoing it will be seen that the process of the present invention provides a process of the extraction of metal from aqueous solutions and readily achieves the objects and advantages set forth above. Although the invention has been described in terms of specified embodiments which are set forth in detail, it should be understood that this is by way of illustration only and that the invention is not necessarily limited thereto, since alternative embodiments and operating techniques will become apparent to those skilled in the art in view of the instant disclosure. Accordingly, modifications are contemplated which can be that departing from the spirit and scope of the described invention limited only by the claims appended hereto.

We claim:

1. A process for extracting at least one metal selected from the group consisting of gold, silver and combinations thereof from an aqueous solution containing said at least one metal, comprising:
   (a) contacting said aqueous solution with an asphaltene to extract said at least one metal from said aqueous solution to said asphaltene; and
   (b) recovering said thus extracted at least one metal from said asphaltene.

2. A process in accordance with claim 1 wherein step (b) is characterized further to include:
   oxidizing said asphaltene and said thus extracted at least one metal to produce oxidized asphaltene and oxides of said at least one metal; and
   separating the oxides of said at least one metal from said oxidized asphaltene resulting from said oxidizing step.

3. A process in accordance with claim 2 wherein said asphaltene is a sulfonated asphaltene produced by:
   reacting a quantity of a petroleum fraction containing asphaltenes with a sulfonating agent to produce a reaction product comprising sulfonated asphaltenes; and
   recovering said sulfonated asphaltenes from said reaction product.

4. A process in accordance with claim 1 wherein said asphaltene is a sulfonated asphaltene produced by:
   reacting a quantity of a petroleum fraction containing asphaltenes with a sulfonating agent to produce a reaction product comprising sulfonated asphaltenes; and
   recovering said sulfonated asphaltenes from said reaction product.

5. A process in accordance with claim 4 wherein said quantity of a petroleum fraction containing asphaltenes is reacted with said sulfonating agent at atmospheric temperature.

6. A process in accordance with claim 4 wherein said quantity of a petroleum fraction containing asphaltenes is reacted with said sulfonating agent at ambient temperature.

7. A process in accordance with claim 4 wherein said petroleum fraction containing asphaltenes is characterized further as the bottoms fraction produced by solvent extraction of heavy oil having an initial boiling point of about 650° F. (343° C.).

8. A process in accordance with claim 4 wherein said sulfonating agent is selected from the group consisting of $SO_3$, $SO_2$, $H_2SO_4$ and combinations of any two or more thereof.

9. A process in accordance with claim 4 wherein said sulfonating agent is $SO_3$.

10. A process in accordance with claim 4 wherein said sulfonating agent is a solution of $SO_3$ in dichloroethane.

11. A process in accordance with claim 4 wherein said sulfonated asphaltenes are recovered from said reaction product by subjecting said reaction product to elevated temperatures and subatmospheric pressure to separate the remainder of said reaction product from said sulfonated asphaltenes.

12. A process in accordance with claim 2 wherein said asphaltene is a sulfonated asphaltene produced by
reacting a quantity of a petroleum fraction containing asphaltenes with a sulfonating agent selected from the group consisting of $SO_3$, $SO_2$, $H_2SO_4$ and combinations of any two or more thereof, to produce the reaction product comprising sulfonated asphaltenes; and
recovering said sulfonated asphaltenes from said reaction product.

13. A process in accordance with claim 2 wherein said asphaltene is a sulfonated asphaltene produced by
reacting a quantity of a petroleum fraction containing asphaltenes with a solution of $SO_3$ in dichloroethane to produce a reaction product comprising sulfonated asphaltenes; and
recovering said sulfonated asphaltenes from said reaction product.

14. A process in accordance with claim 2 wherein said asphaltene is a sulfonated asphaltene produced by
reacting a quantity of a pretroleum bottoms fraction produced by solvent extraction of heavy oil having an initial boiling point of about 650° F. (343° C.) with a sulfonating agent to produce a reaction product comprising sulfonated asphaltenes; and
recovering said sulfonated asphaltenes from said reaction product.

15. A process in accordance with claim 2 wherein said asphaltene is a sulfonated asphaltene produced by
reacting a quantity of a petroleum fraction containing asphaltenes with a solution of $SO_3$ in dichloroethane to produce a reaction product comprising sulfonated asphaltenes; and
recovering said sulfonated asphaltenes from said reaction product by subjecting said reaction product to elevated temperatures and subatmospheric pressure to separate said dichloroethane and the remainder of said reaction product from said sulfonated asphaltenes.

16. A process in accordance with claim 1 wherein step (a) is conducted at an elevated temperature.

17. A process in accordance with claim 1 wherein step (a) is conducted at a temperature in a range from about 80 to about 100° C.

18. A process for extracting at least one metal selected from the group consisting of gold, silver and combinations thereof from an aqueous solution containing said at least one metal comprising:
(a) contacting said aqueous solution with a non-sulfonated asphaltene at an elevated temperature to extract said at least one metal from said aqueous solution to said asphaltene; and
(b) recovering said thus extracted at least one metal from said asphaltene.

19. A process in accordance with claim 18 wherein step (b) is characterized further to include:
oxidizing said non-sulfonated asphaltene and said thus extracted at least one metal to produce oxidized non-sulfonated asphaltene and oxides of said at least one metal; and
separating the oxides of said at least one metal from said oxidized non-sulfonated asphaltene resulting from said oxidizing step.

20. A process in accordance with claim 18 wherein step (a) is conducted at a temperature in the range from about 80° C. to about 100° C.

21. A process for extracting at least one metal selected from the group consisting of gold, silver and combinations thereof from an aqueous solution containing said at least one metal comprising:
(a) contacting said aqueous solution with a sulfonated asphaltene at an elevated temperature to extract said at least one metal from said aqueous solution to said asphaltene, wherein said sulfonated asphaltene is produced by reacting a quantity of a petroleum fraction containing asphaltenes with a sulfonating agent to produce a reaction product comprising sulfonated asphaltenes which are thereafter recovered from said reaction product; and
(b) recovering said thus extracted at least one metal from said sulfonated asphaltene.

22. A process in accordance with claim 21 wherein said quantity of a petroleum fraction containing asphaltenes is reacted with said sulfonating agent at atmospheric pressure.

23. A process in accordance with claim 21 wherein said quantity of a petroleum fraction containing asphaltenes is reacted with said sulfonating agent at ambient temperature.

24. A process in accordance with claim 21 wherein said petroleum fraction containing asphaltenes is characterized further as the bottoms fraction produced by solvent extraction of heavy oil having an initial boiling point of about 650° F. (343° C.).

25. A process in accordance with claim 21 wherein said sulfonating agent is selected from the group consisting of $SO_3$, $SO_2$, $H_2SO_4$ and combinations of any two or more thereof.

26. A process in accordance with claim 21 wherein said sulfonating agent is $SO_3$.

27. A process in accordance with claim 21 wherein said sulfonating agent is a solution of $SO_3$ in dichloroethane.

28. A process in accordance with claim 21 wherein said sulfonated asphaltenes are recovered from said reaction product by subjecting said reaction product to elevated temperatures and subatmospheric pressure to separate the remainder of said reaction product from said sulfonated asphaltenes.

29. A process in accordance with claim 21 wherein step (a) is conducted at a temperature in a frange from about 80° C. to about 100° C.

30. A process in accordance with claim 21 wherein step (b) is characterized further to include:

oxidizing said asphaltene and said thus extracted at least one metal to produce oxidized asphaltene and oxides of said at least one metal; and separating the oxides of said at least one metal from said oxidized asphaltene resulting from said oxidizing step.

31. A process in accordance with claim 30 wherein said asphaltene is a sulfonated asphaltene produced by:

reacting a quantity of a petroleum fraction containing asphaltenes with a sulfonating agent selected from the group consisting of $SO_3$, $SO_2$, $H_2SO_4$ and combinations of any two or more thereof, to produce a reaction product comprising sulfonated asphaltenes; and recovering said sulfonated asphaltenes from said reaction product.

32. A process in accordance with claim 30 wherein said asphaltene is a sulfonated asphaltene produced by reacting a quantity of a petroleum fraction containing asphaltenes with a solution of $SO_3$ in dichloroethane to produce a reaction product comprising sulfonated asphaltenes; and recovering said sulfonated asphaltenes from said reaction product.

33. A process in accordance with claim 30 wherein said asphaltene is a sulfonated asphaltene produced by reacting a quantity of a petroleum bottoms fraction produced by solvent extraction of heavy oil having an initial boiling point of about 650° F. (343° C.) with a sulfonating agent to produce a reaction product comprising sulfonated asphaltenes; and recovering said sulfonated asphaltenes from said reaction product.

34. A process in accordance with claim 30 wherein said asphaltene is a sulfonated asphaltene produced by reacting a quantity of a petroleum fraction containing asphaltenes with a solution of $SO_3$ in dichloroethane to produce a reaction product comprising sulfonated asphaltenes; and recovering said sulfonated asphaltenes from said reaction product by subjecting said reaction product to elevated temperatures and subatmospheric pressure to separate said dichloroethane and the remainder of said reaction product from said sulfonated asphaltenes.

35. A process in accordance with claim 30 wherein step (a) is conducted at a temperature in a range from about 80° C. to about 100° C.

36. A process for extracting at least one metal-containing ion from an aqueous solution, wherein said at least one metal-containing ion is selected from the group consisting of gold-containing ions, silver-containing ions and combinations thereof, said process comprising:

(a) contacting said aqueous solution with an asphaltene to extract said at least one metal-containing ion from said aqueous solution to said asphaltene, to produce a metal-containing asphaltene; and (b) separating said metal-containing asphaltene from said aqueous solution.

37. A process in accordance with claim 36 further comprising:

oxidizing said metal-containing asphaltene to produce a composition comprising an oxidized asphaltene and at least one metal-containing oxide component selected from the group consisting of gold-containing oxides and silver-containing oxides; and separating said at least one metal-containing oxide component from said oxidized asphaltene component.

38. A process in accordance with claim 36 wherein said asphaltene is a sulfonated asphaltene produced by:

reacting a quantity of a petroleum fraction containing asphaltenes with a sulfonating agent under sulfonating conditions to produce a reaction product comprising sulfonated asphaltenes; and recovering said sulfonated asphaltenes from said reaction product.

39. A process in accordance with claim 38 wherein said petroleum fraction containing asphaltenes is characterized further as the bottoms fraction produced by solvent extraction of heavy oil having an initial boiling point of about 650° F. (343° C.).

40. A process in accordance with claim 38 wherein said sulfonating agent is selected from the group consisting of $SO_3$, $SO_2$, $H_2SO_4$ and combinations of any two or more thereof.

41. A process in accordance with claim 40 wherein said sufonating agent is $SO_3$.

42. A process in accordance with claim 38 wherein said sulfonating agent is a solution of $SO_3$ in dichloroethane.

43. A process in accordance with claim 38 wherein said sulfonated asphaltenes are recovered from said reaction product by subjecting said reaction product to elevated temperatures and subatmospheric pressure to separate other components of said reaction product from said sulfonated asphaltenes.

44. A process in accordance with claim 36 wherein said at least one metal-containing ion is selected from the group consisting of gold-containing ions in anionic form, gold-containing ions in cationic form, silver-containing ions in anionic form, silver-containing ions in cationic form and combinations of any two or more thereof.

45. A process in accordance with claim 44 wherein said at least one metal-containing ion is selected from the group consisting of gold-containing ions in the form of $AuCl_4^-$ ions, silver-containing ions in the form of $Ag^+$ ions and combinations thereof.

46. A process in accordance with claim 36 wherein step (a) is conducted at an elevated temperature.

47. A process in accordance with claim 46 wherein step (a) is conducted at a temperature in the range from about 80° to about 100° C.

* * * * *